(12) United States Patent
Hoppe et al.

(10) Patent No.: US 6,428,453 B1
(45) Date of Patent: Aug. 6, 2002

(54) MACHINE TOOL (75) Inventors: Gerd Hoppe, Habichtswald; Hans Gronbach, Eisenberg, both of (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 0 days.

(21) Appl. No.: 09/949,485

(22) Filed: Sep. 7, 2001

(30) Foreign Application Priority Data

Sep. 13, 2000 (DE) .......................................... 100 45 176

(51) Int. Cl.[7] .......................... B23Q 3/157; B23C 9/00; B23B 39/00
(52) U.S. Cl. ...................... 483/58; 408/234; 409/202; 409/203; 409/212; 409/213; 409/235; 483/31
(58) Field of Search ................................ 483/31, 55, 1, 483/13, 58; 409/202, 201, 211, 212, 216, 230, 213, 203, 192, 235; 408/234, 237

(56) References Cited

U.S. PATENT DOCUMENTS

| | | | | |
|---|---|---|---|---|
| 5,154,643 A | * | 10/1992 | Catania et al. ................. | 227/66 |
| 5,187,822 A | * | 2/1993 | Merry ........................ | 414/921 |
| 5,314,397 A | * | 5/1994 | Mills et al. .................. | 29/26 A |
| 5,807,044 A | * | 9/1998 | Watari et al. ................ | 408/236 |
| 5,839,862 A | * | 11/1998 | Hayashi et al. ............. | 408/236 |
| 5,848,458 A | * | 12/1998 | Bullen ........................ | 29/33 K |
| 5,919,014 A | * | 7/1999 | Weck et al. ................. | 408/236 |
| 6,099,217 A | * | 8/2000 | Wiegand et al. ............ | 408/234 |
| 6,254,317 B1 | * | 7/2001 | Chang ........................ | 408/1 R |
| 6,357,094 B1 | * | 3/2002 | Sugimoto .................... | 29/26 A |

FOREIGN PATENT DOCUMENTS

| | | | | |
|---|---|---|---|---|
| DE | 3503300 | * | 8/1986 | ................. 409/212 |
| DE | 40 27 895 | | 3/1992 | |
| DE | 297 05 152 | | 8/1997 | |
| DE | 198 06 085 | | 4/1999 | |
| EP | 0 721 819 | | 7/1996 | |
| JP | 404250911 | * | 9/1992 | ................. 409/212 |
| WO | WO99/08832 | | 2/1999 | |

* cited by examiner

Primary Examiner—William Briggs
(74) Attorney, Agent, or Firm—The Maxham Firm (57) ABSTRACT

A machine tool for cutting workpieces, the machine tool having a tool slide shiftable on or along a machine tool table as support of a machining unit. The machining unit has at least one work spindle and a workpiece support for receiving the workpieces to be machined. For enabling fast machining including an accurate and rapid positioning of the machining unit with as few linear guidances as possible, the tool slide has a transverse support shiftably guided on or along the machine tool table and also has two cross slides shiftable in its longitudinal direction. The machining unit is jointedly arranged between the cross slides via a coupling mechanism having at least two dimensionally stable swivel arms for axially moving the work spindle.

40 Claims, 5 Drawing Sheets

MACHINE TOOL

BACKGROUND

1. Field of the Invention

The invention relates to a machine tool and more particularly to a machine tool for cutting workpieces.

2. Background Discussion

In conventional machine tools for cutting workpieces the relative movement between the tool and the workpiece required for multi-axis machining is generally enabled by three machine parts which are, relative to each other, linearly shiftable along the main coordinate axes. In European patent publication 721819, for example, a machine tool is described in which a machining unit formed as a vertical milling head is disposed on a machine tool table so as to be shiftable, by means of a compound slide, in two horizontal axes which are perpendicular to each other. The compound slide consists of a cross slide shiftable on the machine tool table on first guide rails, a longitudinal slide being shiftable on the cross slide on second guide rails. For the feeding movements along the vertical axis the milling head is disposed on the longitudinal slide so as to be vertically shiftable on third guide rails. In machine tools designed in this way separate linear guides are required for each of the three machine parts shiftable along one of the main coordinate axes, respectively. These are, however, of a complex design and require correspondingly high investment and installation costs. Above that the masses to be moved along the respective coordinate axes are usually relatively large in such machines, whereby the moving speed of the machining unit is limited and the requirements to the guides and drives are correspondingly high.

In German patent publication 19806085 a machine tool for machining workpieces in three axes is described in which one slide, respectively, is shiftable in guides on the two transverse beams of the frame-shaped machine tool table. A coupling system formed by swivel arms connects each of the two slides to a machining unit comprising another slide as well as a tool head shiftable therewith. By controlled movements of the two slides on the longitudinal sleepers the machining unit can be moved to any position within a square machining area. In certain positions of the machining unit, however, extremely high loads are applied on the coupling to system in corresponding angular positions of the swivel arms so that this machine tool is not suitable for high loads, for example, during roughing-down work with a high cutting performance.

Accordingly, there is a need for a machine tool that is relatively fast and stable. The present invention satisfies these needs and provides related advantages as well.

SUMMARY OF THE INVENTION

It is a primary purpose of the invention to provide a machine tool enabling fast machining, including an accurate and rapid positioning of the machining unit with a stable construction including as few linear guides as possible.

According to the invention the purpose is met in that the tool slide comprises a transverse support slidably guided on/along the machine tool table and includes two cross slides shiftable in its longitudinal direction by means of a motor, the working unit being jointedly disposed between the cross slides for enabling an axial movement of the work spindle by means of a coupling mechanism comprising at least two dimensionally stable swivel arms.

The machine concept of the invention is characterized by an extremely stiff machine design of simple construction that enables highly dynamic and at the same time highly accurate shifting movements. With the transverse support shiftable along a first coordinate axis on or along the machine tool table, and with a simple movement of the two cross slides along a second coordinate axis, a fast and accurate positioning of the working unit in space is obtainable with the coupling mechanism of simple construction comprising low movable masses. The cross slides can also be light and simple so that rapid movements and high accelerations are possible. Another important advantage of the machine tool according to the invention is that only one guide is required for shifting movements in two axes.

In a machine tool having a gantry construction, for example, the transverse support may be arranged on two lateral portions of a machine tool table so as to be horizontally shiftable. The transverse support, however, may also be guided along a front or side wall of a machine tool table so as to be vertically movable. In both embodiments a rapid axial movement of the work spindle or work spindles is obtainable by means of the coupling mechanism.

In an embodiment of efficient design the coupling mechanism comprises, for example, two swivel arms, the one ends of which are respectively hinged to a cross slide, and the other ends of which are respectively hinged to the opposed sides of the machining unit. Adjacent to one of the two swivel arms another swivel arm is provided by which the machining unit is jointedly connected with one of the cross slides. In this way a kind of parallel rod or shearing kinematics is obtained which enables an axial movement of the work spindle in case of a synchronous movement of the cross slides in opposite directions, and also enables a movement of the work spindle transverse to their axial direction in case of a synchronous movement of the cross slides in the same direction.

In a light weight and yet stable embodiment the swivel arms may, for example, be jointed beams welded from side plates and transverse braces. The swivel arms may also be formed as supports or the like having a circular or rectangular cross-section.

Another advantageous embodiment is characterized in that the length of at least the upper swivel arm is adjustable. In this way an inclined posture of the machining unit is enabled whereby, for example, shaped bevels or the like can be machined in a simple way. The rapid and suitable automatic length adjustment of a swivel arm may be realized by designing the same as a telescope arm comprising inner and outer arm portions which are shiftable with respect to each other. The movement of the arm portions may be effected by linear drives or other suitable drives in this case.

Another possibility to obtain an inclined posture of the machining unit is to provide at least one of the two cross slides with a first slide part horizontally shiftable on the transverse support and a motor-driven second slide part slidably guided on the same on guide rails. The upper end of the upper swivel arm is hinged to the second slide part. In this way a tilted or inclined posture of the machining unit may be obtained even without swivel arms with adjustable lengths.

In an embodiment particularly suitable for a rapid machining of small to medium-sized workpieces, the workpiece support comprises a support column turnable about a vertical axis by means of a motor, clamping blocks or the like arranged in equal intervals in the circumferential direction being attached to the support column so as to be turnable about its central axis. Thereby a rapid workpiece exchange is enabled without excessive standstill times. For machining large and heavy workpieces, the workpiece support may, however, also be a rigid round table or a round table rotatable about a vertical axis.

A rapid tool exchange may be realized in a particularly advantageous manner by providing a tool storage means comprising at least two opposed tool magazines disposed in the rear part of the machine tool table. For a tool exchange the machining unit may be moved between the two tool magazines, in which case then the old tools may be disposed in one magazine and the new tools taken from the opposite magazine with minimum moving distances.

In a particularly efficacious embodiment, the machining spindle comprises two or more work spindles. In this way several workpieces may be processed simultaneously.

BRIEF DESCRIPTION OF THE DRAWING

The objects, advantages and features of the invention will be more clearly understood from the following detailed description, when read in conjunction with the accompanying drawing, in which.

DETAILED DESCRIPTION OF THE PREFERRED EMBODIMENTS

Figure 1:
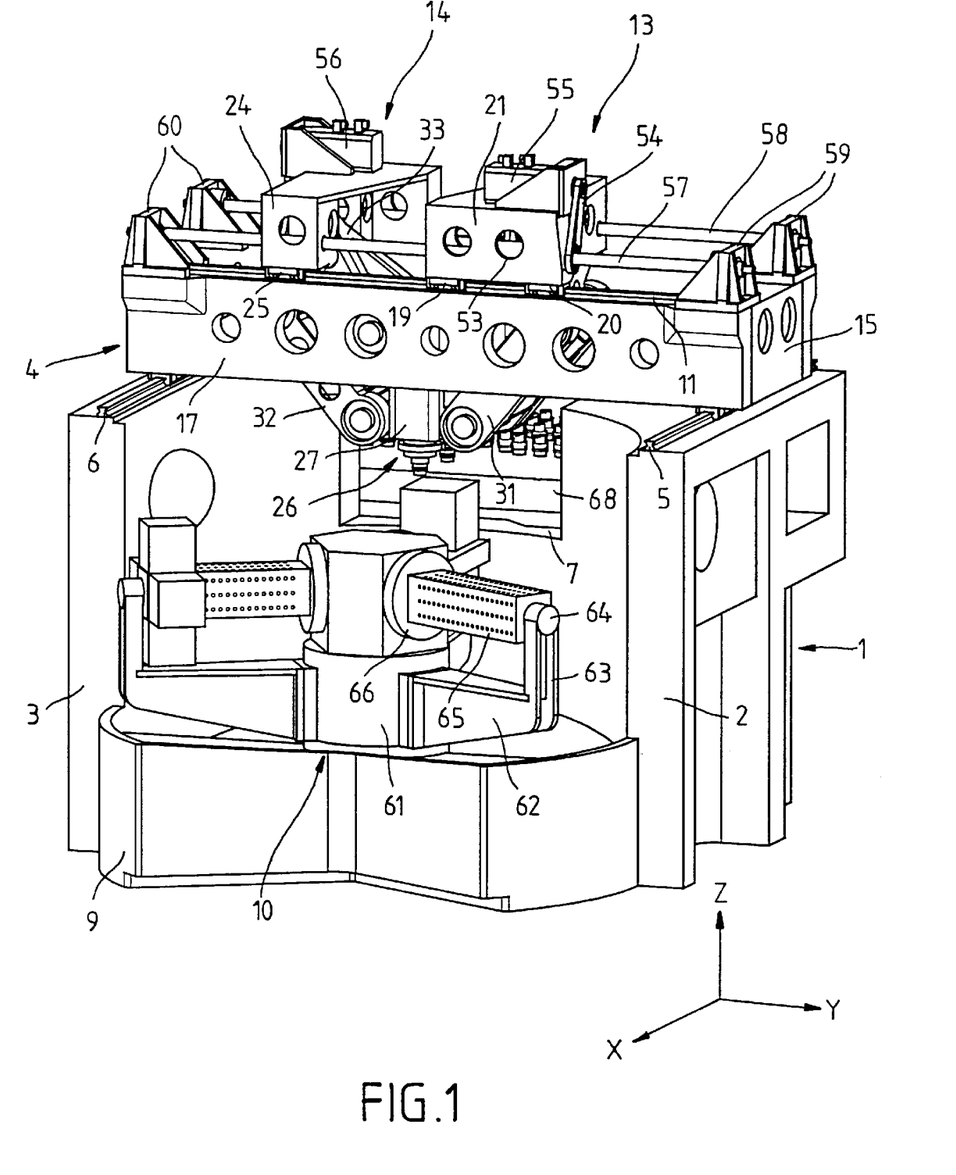
FIG. 1 is a schematic perspective view of the basic design of a machine tool according to the invention.
Figure 2:
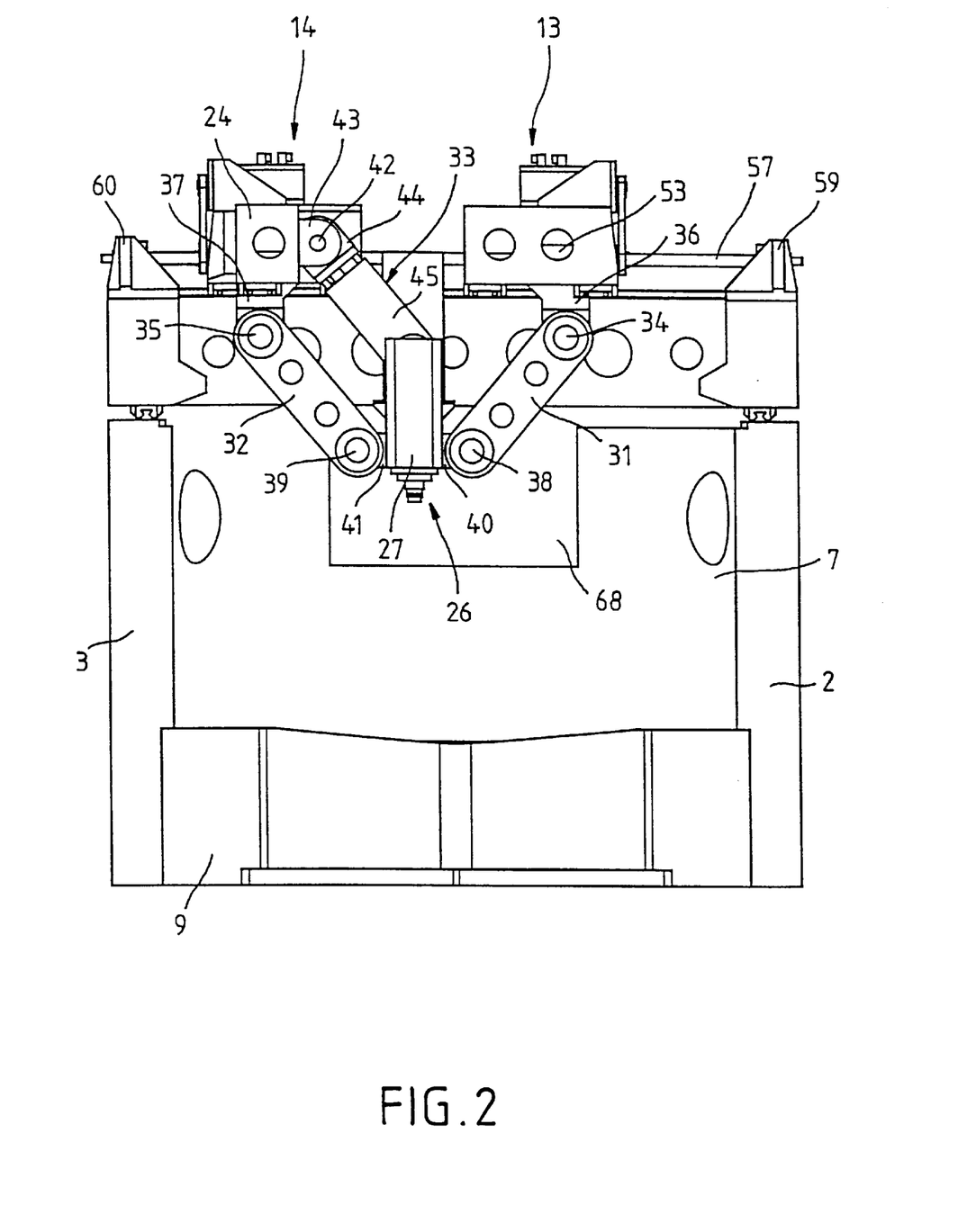
FIG. 2 is a schematic front view of the machine tool of the invention with the front wall of the transverse support and the workpiece support omitted.
Figure 3:
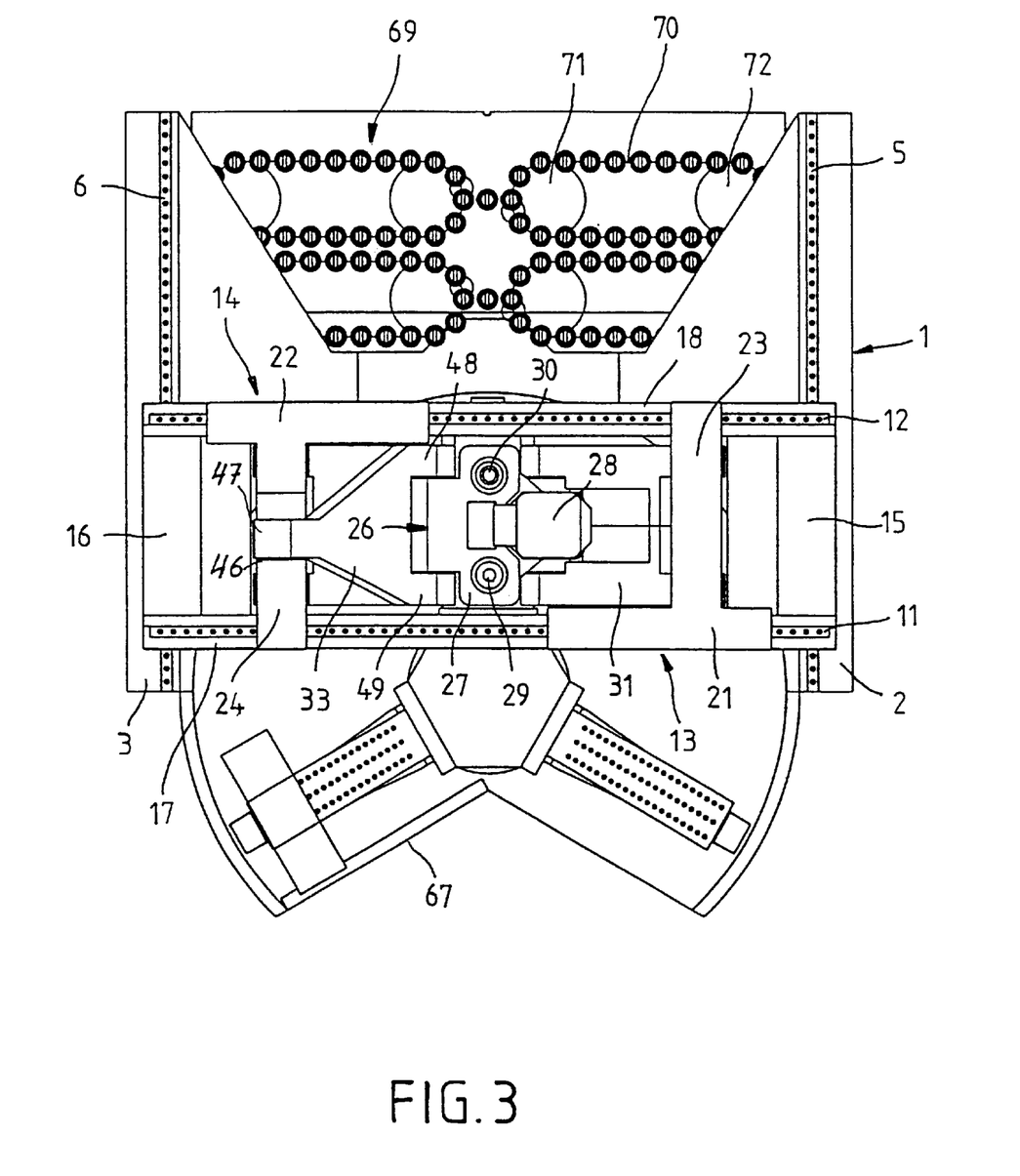
FIG. 3 is a schematic top view of the machine tool shown in FIG. 1.

The machine tool schematically shown in FIGS. 1 to 3 comprises dimensionally stable machine tool table 1 including two opposed side parts 2 and 3 on which transverse support 4 is arranged on two parallel guide rails 5 and 6 so as to be horizontally shiftable along a first moving axis (the X-axis) by means of a drive (not shown). Side portions 2 and 3 of machine tool table 1 are formed as side walls and are fixedly connected to each other by means of transverse rear wall 7 which is, in the illustrated embodiment, formed so that machine tool table 1 is, from a top view, provided with approximately semicircular recess 8 between side portions 2 and 3 at its front side. Inside recess 8 the rear half of base 9 is disposed which is circular from a top view. To the rear side, the work area of the milling and drilling machine disposed above base 9 is limited by the semicircular face side of transverse wall 7. On base 9 fixedly connected to machine tool table 1 or integrally formed therewith is workpiece support 10, described in detail later, employed for receiving the workpieces to be machined. The upper side of base 9 is formed as a receiver pan for chips and the like produced during machining.

On the upper side of transverse support 4 are mounted two guide rails 11 and 12, perpendicular to guide rails 5 and 6. On guide rails 11 and 12 are arranged two cross slides 13 and 14 so as to be horizontally movable in a second moving axis (the Y-axis) which is perpendicular with respect to the first moving axis (the X-axis).

As can be seen particularly from FIGS. 1 and 3, transverse support 4 is a dimensionally stable, rectangular frame construction consisting of two shorter lateral portions 15, 16 running on guide rails 5 and 6, and longer front and rear transverse bars 17 and 18 provided with openings. Guide rails 11 and 12 for cross slides 13 and 14 are attached to parallel and spaced apart transverse bars 17 and 18. According to FIG. 3, cross slides 13 and 14 each consist of guidance body 21 or 22 guided on one of guide rails 11 or 12 by two guiding elements 19 and 20 and extending in their longitudinal direction. Cross slides 13 and 14 each also consist of horizontal support body 23 or 24 provided in an angle of 90° thereto, the end side of which is guided along the respectively other guide rail 12 or 11 by single guidance element 25. Cross slides 13 and 14 are arranged in a staggered manner so that the guidance body of one cross slide and the support body of the other cross slide are respectively guided on one guide rail. In the side walls of cross slides 13 and 14 formed in a box design, for example, as a welded construction, openings are provided, whereby the mass to be moved is reduced. On two support bodies 23 and 24 is machining unit 26, disposed in the free space between spaced transverse bars 17 and 18. Machining unit 26 comprises, in this case, two work spindles 29 and 30 supported in a housing and driven by at least one driving motor 28 that is hinged via swivel arms 31, 32 and 33 so that machining unit 26 can be moved in the Y and Z planes by movement of cross slides 13 and 14 in opposite directions. With a movement of two cross slides 13 and 14 in the same direction, machining unit 26 is shifted along the Y axis.

As can be seen from FIG. 2, the upper ends of lower swivel arms 31 and 32 are hinged to downwardly protruding portions 36 and 37 of support bodies 23 and 24 by means of joints 34 and 35. The lower ends of swivel arms 31 and 32 are hinged to lateral shoulders 40 and 41 of housing 27 of machining unit 26 via joints 38 and 39. According to FIG. 2, above lower left swivel arm 32, upper swivel arm 33 is provided which is hinged to lateral shoulder 43 of support body 24 with its upper end by means of joint 42 and hinged to the upper end of housing 27 of machining unit 26 with its lower end. In this embodiment, upper swivel arm 33 is formed as a telescopic element comprising inner and outer arm portions 44 and 45 which are movable relative to each other. By extending or contracting outer arm portion 45 by means of a suitable linear drive or the like (not shown), machining unit 26 may thereby be tilted and returned to its full vertical position, as shown.

Upper swivel arm 33 may also be a rigid beam of unchangeable length as shown in FIG. 1, and particularly in FIG. 3. In the embodiment shown there the, for example, triangular upper swivel arm 33 is hinged to central recess 47 in support body 24 with its narrow upper end 46, and by means of lateral lower legs 48 and 49, to the left side of housing 27, as seen in FIG. 3. With this embodiment, however, no inclined posture of the machining unit is possible.

Figure 4:
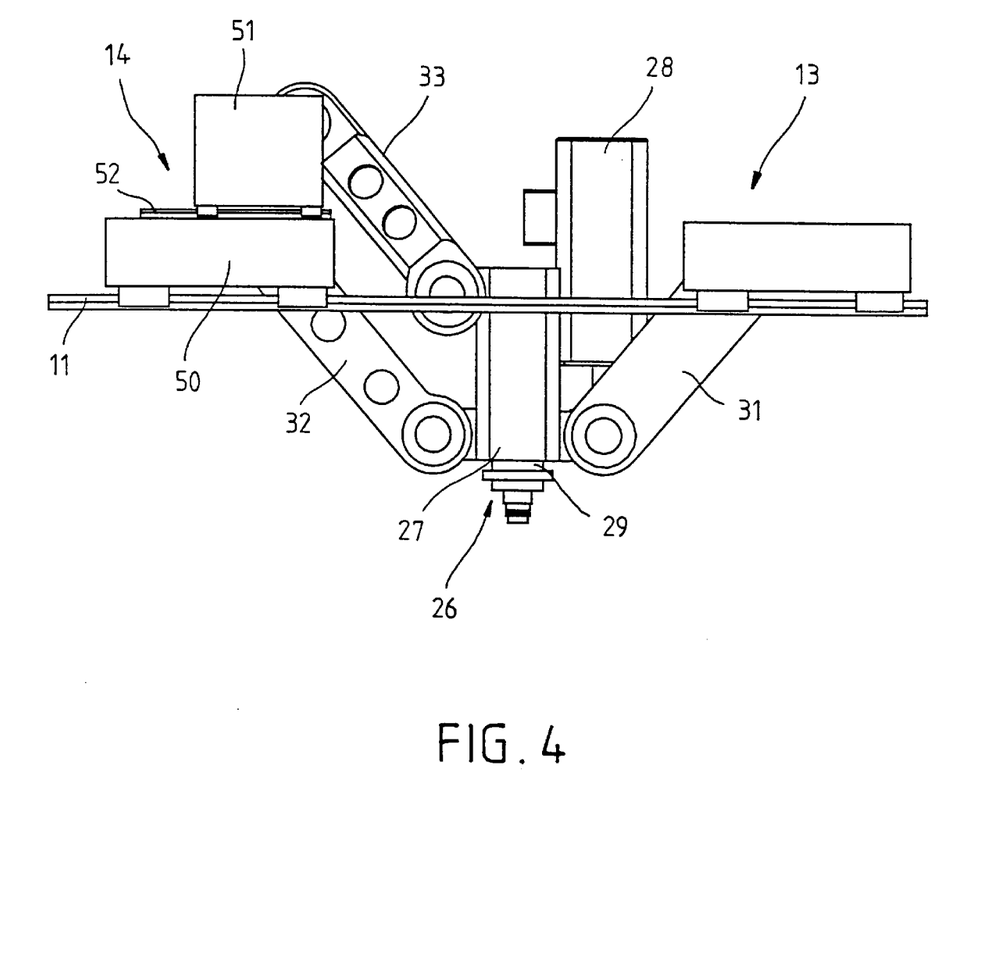
FIG. 4 is a detailed view of another embodiment of a coupling mechanism between the cross slides and the machining unit according the invention.

In the coupling mechanism depicted as another embodiment as shown in FIG. 4, an inclined posture of machining unit 26 is enabled in that left cross slide 14 is provided with lower slide part 50 which is horizontally slidable on transverse support 4 on guide rails 11 and 12, and upper slide part 51 slidably guided on guide rails 52 by means of a driving motor (not shown). The upper end of swivel arm 32 is hinged to lower slide part 50 and the upper end of swivel arm 33 is hinged to upper slide part 51. By shifting upper slide part 52 on lower slide part 51 thus, an inclined posture of machining unit 26 can be obtained.

In the machine tool shown, the drive of cross slides 13 and 14 is respectively effected by a ball spindle drive shown in FIGS. 1 and 2, comprising spindle nut 53 disposed in guidance body 21 and 22 of the respective cross slide, and threaded spindle 57 or 58 driven by motor 55 or 56 via belt drive 54. The ends of threaded spindles 57 and 58 are supported on transverse support 4 by means of angle brackets 59 and 60, right cross slide 13 being driven by front side threaded spindle 57 and left cross slide 14 being driven by rear side threaded spindle 58. Cross slides 13 and 14 may, however, also be shifted by linear drives or other suitable drives. In FIG. 3 the drives of cross slides 13 and 14 are omitted for simplification.

Workpiece support 10 shown in FIGS. 1 and 3 comprises vertical support column 61 disposed approximately in the center of base 9 so as to be rotatable about its vertical center axis by means of a drive (not shown). Angular supports 62 are disposed generally equiangularly around support column 61. Supports 62 are formed with end portions 63 which protrude generally upwardly and support end side bearing journal 64 of square-shaped clamping block 65, or a clamping plate or the like. Each clamping block 65 is, by means of a flange 66, disposed on its end opposite to bearing 64, attached to support column 61 so as to be rotatable about its horizontal central axis by means of a drive (not shown). The workpieces to be machined may be clamped to any or all of the four side faces of each clamping block 65. The clamping block protruding to the rear side in FIG. 1 is in a machining position while the clamping blocks protruding obliquely to the front are in a set-up position in which the workpieces to be newly machined may be clamped and from which the finished workpieces may be removed. For a better accessibility of two clamping blocks 65, base 9 is provided with recess 67 in its front side, which has the shape of the segment of a circle when regarded in the top view (FIG. 3). In addition, the machine tool shown in FIGS. 1 to 3 is preferably accommodated in a protection cabin (not shown) for protecting the surrounding environment.

By moving transverse support 4, machining unit 26 of FIG. 1, including two parallel work spindles 29 and 30, may be moved along the X axis. During a synchronous shift of cross slides 13 and 14 in the same direction the machining unit is adjusted along the horizontal Y axis and, when cross slides 13 and 14 are moved toward each other or away from each other, along the vertical Z axis. An inclined posture of machining unit 26, on the other hand, may be effected either by extending swivel arm 33, designed as a telescope arm, or by shifting upper slide part 51 on lower slide part 50.

In the upper section of transverse wall 7 of machine tool table 1, rectangular recess 68 is provided through which machining unit 26 can be moved to tool storage means 69 provided behind it. As can be seen in FIG. 3, tool storage means 69 consists of four tool magazines 70 disposed behind transverse wall 6 between two side walls 2 and 3, two of the tool magazines being respectively arranged in an opposed manner so that used tools may be returned to the tool magazines disposed on one side and new tools can be taken from the opposed tool magazines with minimum lateral movements of machining unit 26 disposed in an intermediate position between tool magazines 70. In the illustrated embodiment the tool magazines are formed as chain magazines guided on driving wheels or disks 71 and 72. However, disk magazines or the like are also possible.

Figure 5:
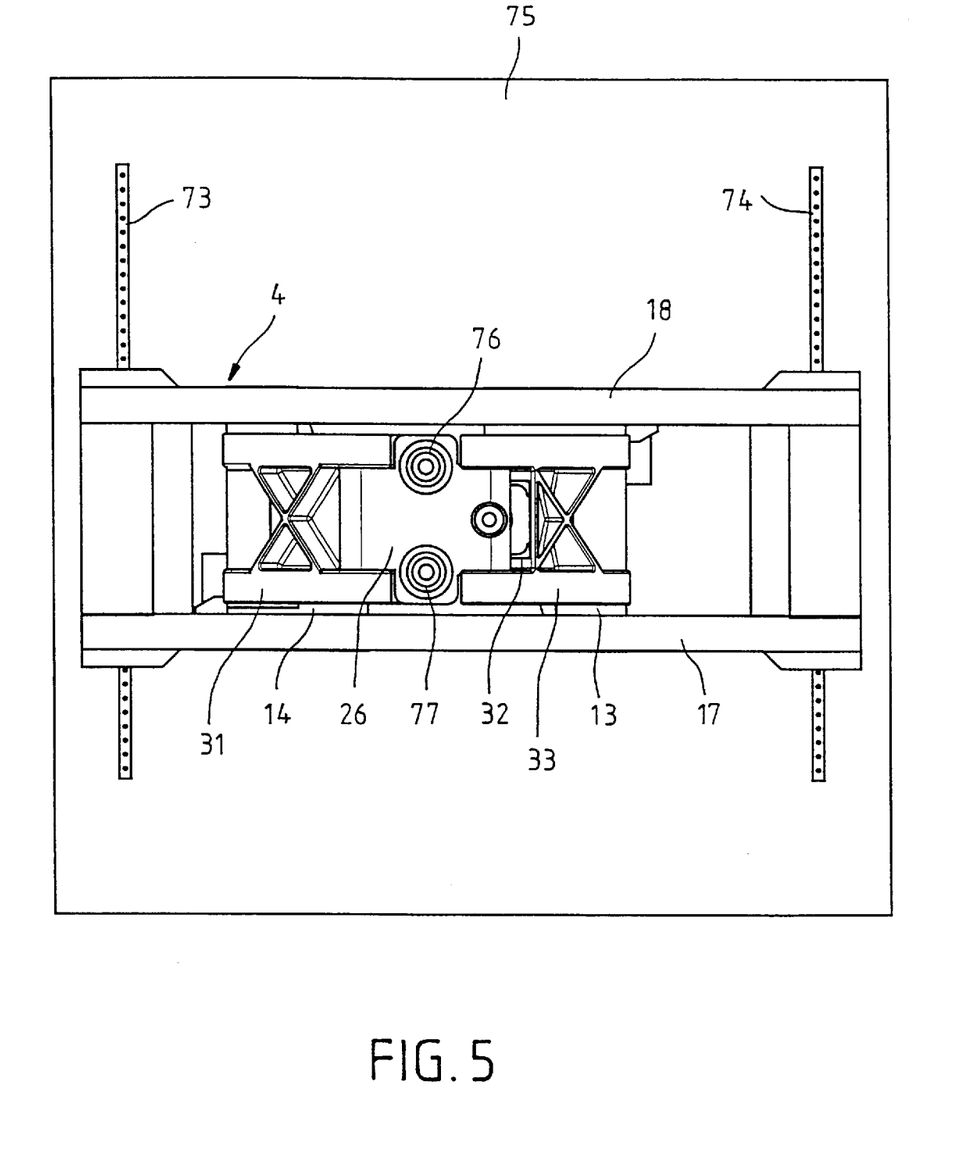
FIG. 5 shows yet another embodiment of the machine tool according to the invention.

In FIG. 5 is shown another embodiment of a machine tool according to the invention. In this embodiment transverse support 4 is arranged on vertical front or side wall 75 of a machine tool table so as to be shiftable along a vertical axis on vertical guide rails 73 and 74. Between transverse walls 17 and 18 of transverse support 4, machining unit 26, including horizontal work spindles 76 and 77, is hinged to two cross slides 13 and 14 via the coupling mechanism comprising three swivel arms 31, 32 and 33. As in the embodiment described above, in this case also two cross slides 13 and 14 are arranged on transverse support 4 so as to be shiftable by means of suitable drives. With a synchronous movement of cross slides 13 and 14 in opposite directions, an axial movement of work spindles 76 and 77 in the horizontal direction may be realized by means of the coupling mechanism. With a synchronous movement of cross slides 13 and 14 in the same direction work spindles 76 and 77 may, on the other hand, be horizontally moved transverse to their axial direction.

The invention is not limited to the embodiments described in detail and shown in the drawings figures. It is also possible to provide a plurality of work spindles in a kind of frame, slide or the like so that the distances between them are changeable or adjustable. In this way the machining distance could be controlled, and the range of application could be increased. Further, the machining unit may also designed so as to be rotatable about a vertical axis so that the posture of the individual work spindles can be changed. Instead of the work spindles driven by a common motor, one or more individually driven motor spindles could be used. Particularly advantageous in practice is a variant in which one or all work spindles of a multi-spindle machining unit are provided with a length adjustment for the respective tool to enable a compensation of slight length differences between the individual tools caused, for example, by wear, regrinding or the like in a simple way and without time loss. The length compensation may be carried out manually or, more efficiently, by means of a motor, and it may comprise an actuator enabling a correction of the position of the respective work spindle including the clamped tool upon corresponding control.

Furthermore, the clamping means described in detail and comprising the plurality of turnable clamps may be replaced by a rigid or, for example, motor-driven round table or the like.

Finally, in a variation of the embodiment illustrated in FIG. 5, transverse support 4 may be horizontally shiftable on upper and lower horizontal face side guide rails 73 and 74, the other components being formed as shown in FIG. 5 and rotated by 90°.

What is claimed is:

1. A machine tool for cutting workpieces comprising:
   a machine tool table;
   a motor;
   a machining unit comprising at least one work spindle;
   a tool slide shiftable on or along said machine tool table by means of said motor, said tool slide providing support for said machining unit; and
   a workpiece support for supporting workpieces to be processed wherein said tool slide further comprises a transverse support shiftably guided on or along said machine tool table, said transverse support comprising two cross slides shiftable in a longitudinal direction, said machining unit being jointedly arranged between said cross slides for axially moving said work spindle via a coupling mechanism, and said coupling mechanism comprising at least two dimensionally stiff swivel arms.

2. The machine tool according to claim 1, wherein said transverse support is guided on two lateral portions of said machine tool table so as to be horizontally shiftable.

3. The machine tool according to claim 1, wherein said transverse support is guided on a front or side wall of said machine tool table so as to be vertically or horizontally shiftable.

4. The machine tool according to claim 1, wherein said transverse support is a dimensionally stiff, elongated, rectangular frame construction of shorter side portions and longer support bars between which said machining unit is disposed.

5. The machine tool according to claim 2, wherein said transverse support is a dimensionally stiff, elongated, rectangular frame construction of shorter side portions and longer support bars between which said machining unit is disposed.

6. The machine tool according to claim 3, wherein said transverse support is a dimensionally stiff, elongated, rectangular frame construction of shorter side portions and longer support bars between which said machining unit is disposed.

7. A machine tool for cutting workpieces comprising:
   a machine tool table;
   a motor;
   a machining unit comprising at least one work spindle;
   a tool slide shiftable on or along said machine tool table by means of said motor, said tool slide providing support for said machining unit; and
   a workpiece support for supporting workpieces to be processed wherein said tool slide further comprises a transverse support shiftably guided on or along said machine tool table, said transverse support comprising two cross slides shiftable in longitudinal direction, said machining unit being jointedly arranged between said cross slides for axially moving said work spindle via a coupling mechanism, and said coupling mechanism comprising:
      at least two dimensionally stiff swivel arms hinged respectively to one cross slide with their one ends and to the opposed sides of said machining unit with their other ends; and
      an additional swivel arm by which said machining unit is jointedly connected to one of said cross slides.

8. The machine tool according to claim 2, wherein said coupling mechanism comprises:
   two swivel arms hinged respectively to one cross slide with their one ends and to the opposed sides of said machining unit with their other ends; and
   an additional swivel arm by which said machining unit is jointedly connected to one of said cross slides.

9. The machine tool according to claim 3, wherein said coupling mechanism comprises:
   two swivel arms hinged respectively to one cross slide with their one ends and to the opposed sides of said machining unit with their other ends; and
   an additional swivel arm by which said machining unit is jointedly connected to one of said cross slides.

10. The machine tool according to claim 4, wherein said coupling mechanism comprises:
    two swivel arms hinged respectively to one cross slide with their one ends and to the opposed sides of said machining unit with their other ends; and
    an additional swivel arm by which said machining unit is jointedly connected to one of said cross slides.

11. The machine tool according to claim 7, where the length of at least said additional swivel arm is adjustable.

12. The machine tool according to claim 11, wherein said additional swivel arm is a telescopic arm comprising inner and outer arm portions which can be shifted against each other.

13. The machine tool according to claim 7, wherein at least one of said two cross slides comprises a first slide part horizontally shiftable on said transverse support and a second slide part shiftably guided on guide rails on said first slide part, said additional swivel arm being flanged to said second slide part.

14. The machine tool according to claim 1, wherein said cross slides are respectively driven by a linear drive.

15. The machine tool according to claim 2, wherein said cross slides are respectively driven by a linear drive.

16. The machine tool according to claim 3, wherein said cross slides are respectively driven by a linear drive.

17. The machine tool according to claim 4, wherein said cross slides are respectively driven by a linear drive.

18. The machine tool according to claim 7, wherein said cross slides are respectively driven by a linear drive.

19. The machine tool according to claim 11, wherein said cross slides are respectively driven by a linear drive.

20. The machine tool according to claim 12, wherein said cross slides are respectively driven by a linear drive.

21. The machine tool according to claim 13, wherein said cross slides are respectively driven by a linear drive.

22. The machine tool according to claim 1, wherein said machining unit further comprises two or more work spindles.

23. The machine tool according to claim 7, wherein said machining unit further comprises two or more work spindles.

24. The machine tool according to claim 14, wherein said machining unit further comprises two or more work spindles.

25. The machine tool according to claim 22, wherein at least one of said work spindles is provided with a length compensation for the respectively clamped workpiece.

26. The machine tool according to claim 2, wherein said two lateral portions of said machine tool table are connected by a rear transverse wall, said transverse wall having an approximately semicircular face side and a base also connecting said lateral portions is provided, said base serving as chip collector and comprising a workpiece support unit arranged thereon.

27. The machine tool according to claim 26, wherein said workpiece support unit comprises:
    a support column turnable about a vertical axis by means of a second motor; and
    clamping blocks serving as workpiece clamps arranged on said support column in equal intervals in the circumferential direction so as to be rotatable about its horizontal central axis.

28. The machine tool according to claim 26, wherein said workpiece support unit is a round table that is rigid or rotatable about a vertical axis by means of a second motor.

29. The machine tool according to claim 26, wherein a tool storage is provided behind said rear transverse wall and the upper part of said transverse wall comprises a recess through which said machining unit passes for a tool exchange.

30. The machine tool according to claim 27, wherein a tool storage is provided behind said rear transverse wall and the upper part of said transverse wall comprises a recess through which said machining unit passes for a tool exchange.

31. The machine tool according to claim 28, wherein a tool storage is provided behind said rear transverse wall and the upper part of said transverse wall comprises a recess through which said machining unit passes for a tool exchange.

32. The machine tool according to claim 1, wherein said machine tool table further comprises two lateral portions connected by a transverse wall, said transverse wall having an approximately semicircular face side and a base also connecting said lateral portions is provided, said base serving as chip collector and comprising a workpiece support unit arranged thereon.

33. The machine tool according to claim 7, wherein said machine tool table further comprises two lateral portions connected by a transverse wall, said transverse wall having an approximately semicircular face side and a base also connecting said lateral portions is provided, said base serving as chip collector and comprising a workpiece support unit arranged thereon.

34. The machine tool according to claim 14, wherein said machine tool table further comprises two lateral portions connected by a transverse wall, said transverse wall having an approximately semicircular face side and a base also connecting said lateral portions is provided, said base serving as chip collector and comprising a workpiece support unit arranged thereon.

35. The machine tool according to claim 7, wherein said workpiece support unit comprises:

a support column turnable about a vertical axis by means of a second motor; and clamping blocks serving as workpiece clamps arranged on said support column in equal intervals in the circumferential direction so as to be rotatable about its horizontal central axis.

36. The machine tool according to claim 14, wherein said workpiece support unit comprises:

a support column turnable about a vertical axis by means of a second motor; and clamping blocks serving as workpiece clamps arranged on said support column in equal intervals in the circumferential direction so as to be rotatable about its horizontal central axis.

37. The machine tool according to claim 7, wherein said workpiece support unit is a round table that is rigid or rotatable about a vertical axis by means of a second motor.

38. The machine tool according to claim 14, wherein said workpiece support unit is a round table that is rigid or rotatable about a vertical axis by means of a second motor.

39. The machine tool according to claim 7, wherein a tool storage is provided behind said rear transverse wall and the upper part of said transverse wall comprises a recess through which said machining unit passes for a tool exchange.

40. The machine tool according to claim 14, wherein a tool storage is provided behind said rear transverse wall and the upper part of said transverse wall comprises a recess through which said machining unit passes for a tool exchange.

\* \* \* \* \*